(No Model.) 3 Sheets—Sheet 1.

W. A. HOLT.
SEED PLANTER AND FERTILIZER DISTRIBUTER.

No. 405,478. Patented June 18, 1889.

WITNESSES:
D. C. Reusch
E. Sedgwick

INVENTOR:
W. A. Holt
BY
Munn & Co.
ATTORNEYS.

N. PETERS, Photo-Lithographer, Washington, D. C.

(No Model.) 3 Sheets—Sheet 2.
W. A. HOLT.
SEED PLANTER AND FERTILIZER DISTRIBUTER.
No. 405,478. Patented June 18, 1889.
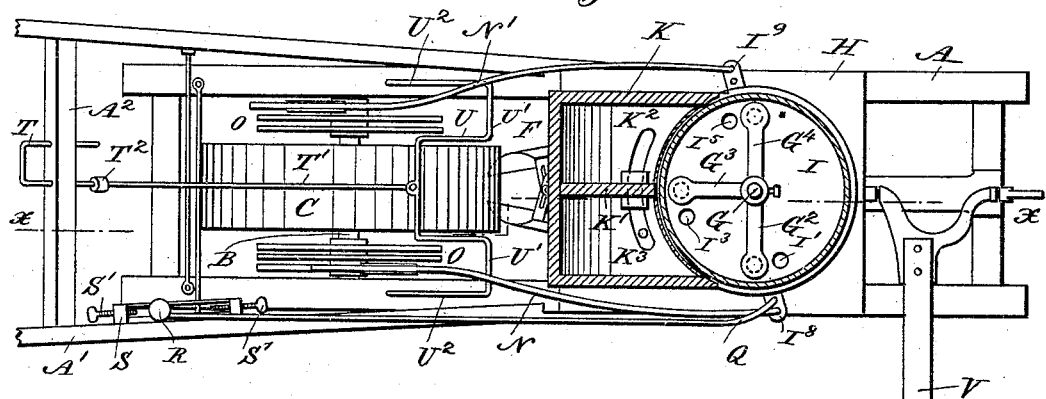
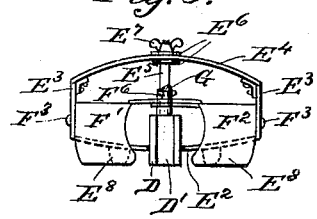
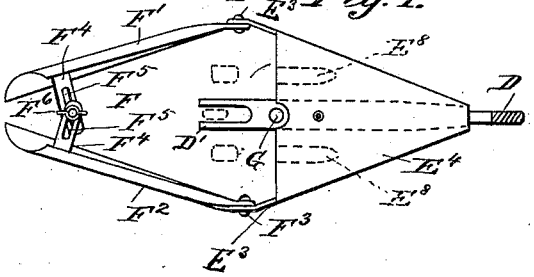
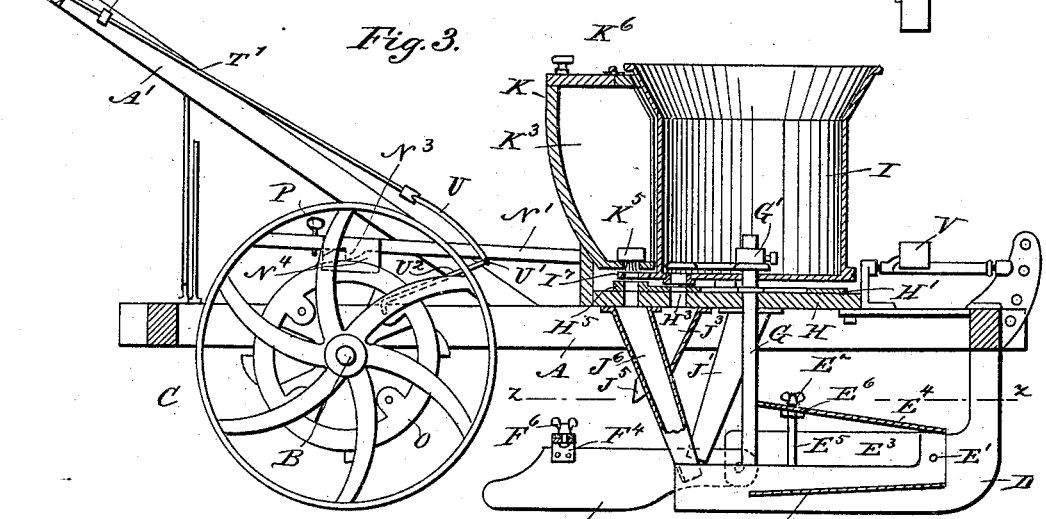
WITNESSES:
D. C. Reusch
C. Sedgwick
INVENTOR:
W. A. Holt
BY Munn & Co.
ATTORNEYS.

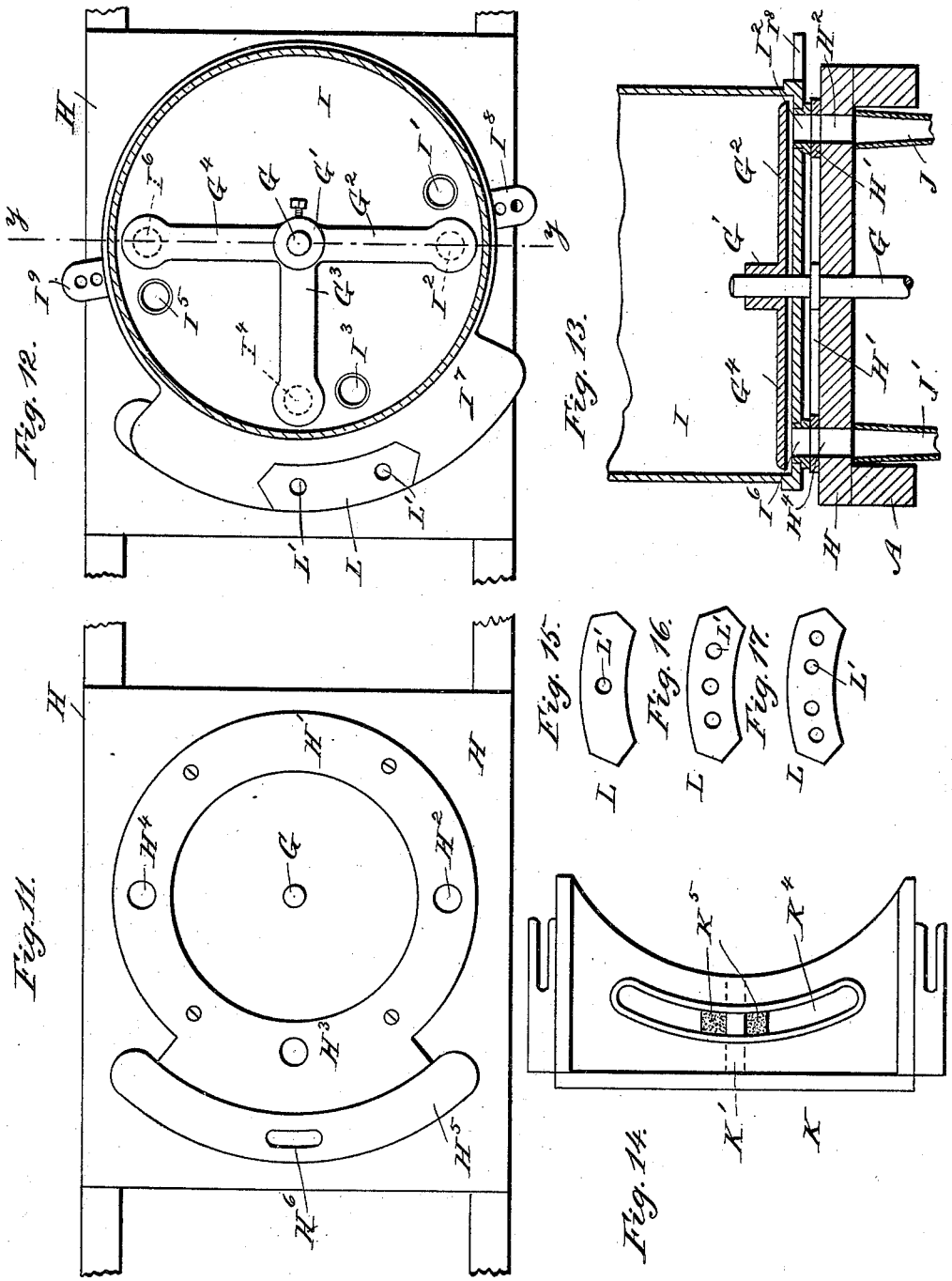

UNITED STATES PATENT OFFICE.

WHITMON A. HOLT, OF HARRISON, MAINE.

SEED-PLANTER AND FERTILIZER-DISTRIBUTER.

SPECIFICATION forming part of Letters Patent No. 405,478, dated June 18, 1889.

Application filed January 22, 1889. Serial No. 297,172. (No model.)

*To all whom it may concern:*

Be it known that I, WHITMON A. HOLT, of Harrison, in the county of Cumberland and State of Maine, have invented a new and Improved Seed-Planter and Fertilizer-Distributer, of which the following is a full, clear, and exact description.

The invention relates to seed-planters and fertilizer-distributers such as shown and described in the application for Letters Patent of the United States filed by me November 6, 1888, Serial No. 290,105.

The object of the present invention is to provide a new and improved planter which is very simple and durable in construction and adapted to drop the seed and fertilizer in holes located any desired distance apart, and further adapted to drop two different kinds of seeds in hills located nearer together or farther apart, and designed to operate the dropping device either automatically or by hand, as desired.

The invention consists in certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1:
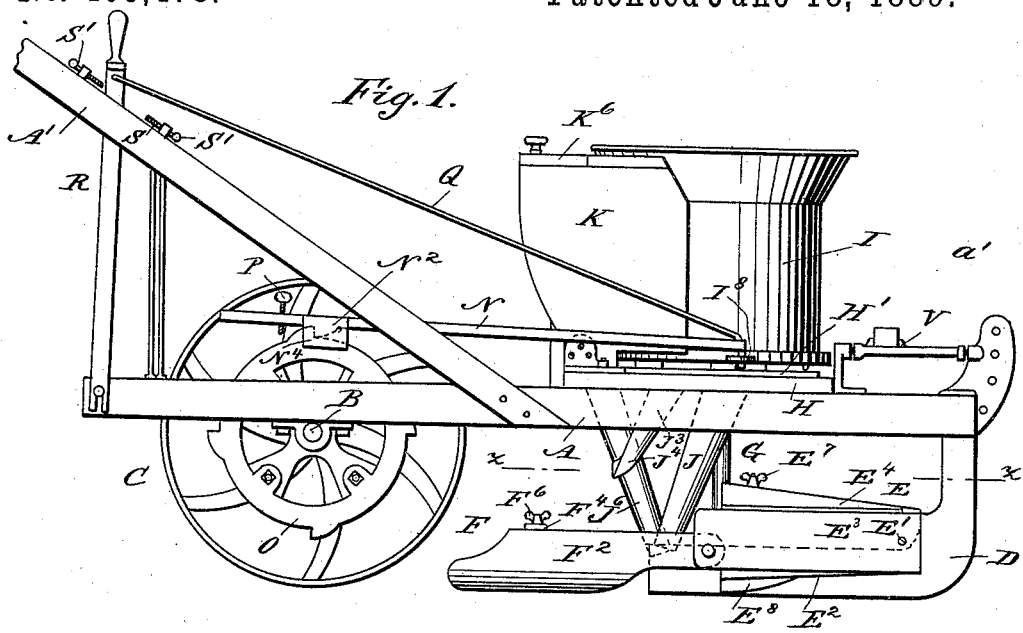
Figure 6:
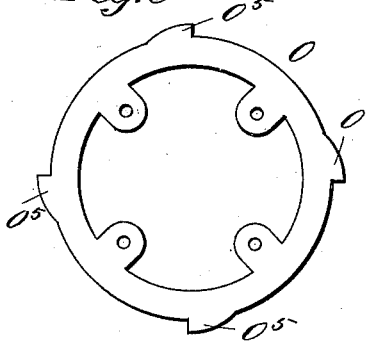
Figure 7:
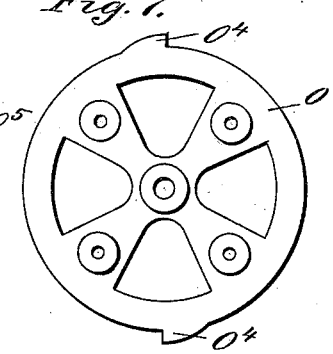
Figure 8:
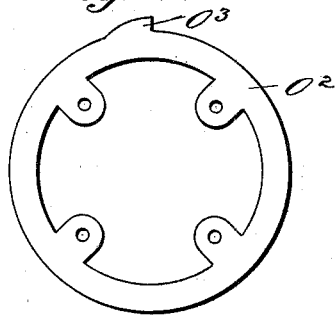
Figure 9:
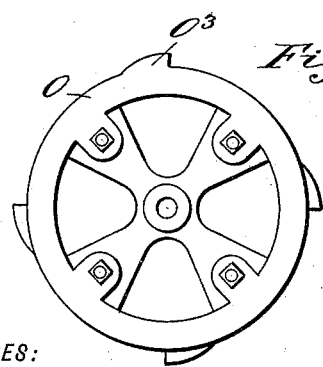
Figure 10:
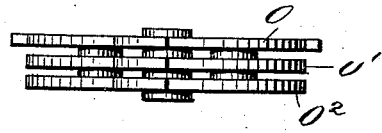

Figure 1 is a side elevation of the improvement. Fig. 2 is a plan view of the same with the seed-box and fertilizer-hopper in section. Fig. 3 is a sectional side elevation of the same on the line $x\,x$ of Fig. 2. Fig. 4 is a sectional plan view of the plow on the line $z\,z$ of Figs. 1 and 3. Fig. 5 is an end elevation of the same. Figs. 6, 7, and 8 are enlarged face views of the cam-wheels. Figs. 9 and 10 are enlarged face and plan views of the cam-wheels as fastened together. Fig. 11 is an enlarged plan view of the seat for the seed-box and fertilizer-hopper. Fig. 12 is an enlarged sectional plan view of the fertilizer-hopper and the seat with the seed-box removed. Fig. 13 is a transverse section of the same on the line $y\,y$ of Fig. 12. Fig. 14 is an enlarged inverted plan view of the seed-box, and Figs. 15, 16, and 17 are plan views of the interchangeable plates for the seed-box bottom.

The improved planter is provided with a rectangular frame A, near the rear end of which is mounted in suitable bearings the main shaft B, on which is fastened the drive-wheel C, located between the side beams of the frame A. On the front end of the rectangular frame A is secured the plow D, made L-shaped and having its rear end forked at D', as is plainly shown in Fig. 4.

On the plow D is pivoted at E' the mold-board E. The latter is provided with the bottom parts $E^2$, extending on each side of the plow D, their inner edges resting on the sides of the plow, as is plainly shown in Fig. 5. From the bottom parts $E^2$ extend vertically the sides $E^3$, connected with each other at their upper ends by the top part $E^4$, extending across the horizontal part of the plow D. The mold-board E can be swung up or down by means of a screw-rod $E^5$, screwing at its lower threaded end into the rear end of the plow D. The upper end of the rod $E^5$ supports between two washers $E^6$ (see Fig. 5) the top part $E^4$ of the mold-board, and on the outer end of the rod is secured a winged collar $E^7$, for conveniently turning the bolt $E^5$, so as to screw it up and down in the plow D, and consequently swinging the mold-board E up and down at its rear end, said mold-board turning on its pivot E'. On the under sides of the bottom parts $E^2$ of the mold-board E are secured or formed the ridges $E^8$, serving as plows to make extra furrows on either side of the furrow made by the main plow D. The fertilizer is dropped in these furrows.

The sides $E^3$ of the mold-board E extend rearward a short distance, as is plainly illustrated in Figs. 1 and 4, so as to support the covering-plow F, comprising the curved side parts F' and $F^2$, pivotally connected at their ends at $F^3$ with the rearwardly-extending ends of the side parts $E^3$ of the mold-board E. From the rear ends of the sides F' and $F^2$ of the covering-plow F extend inward the arms $F^4$, each provided with a slot $F^5$. The arms $F^4$ overlap each other, and can be secured together by a bolt $F^6$ passing through the slots $F^5$. When the bolt is slackened, the rear ends of the sides F' and $F^2$ can be moved farther apart or nearer together and then fastened in place by the said bolt $F^6$. This permits of forming a wider or narrower ridge over the seed.

On the rear end of the plow D is also secured the upwardly-extending spindle G, passing through the seat H and centrally through the bottom of the fertilizer-hopper I, which is mounted to turn on the said spindle G as a center. The fertilizer-hopper I is provided in its bottom with a number of apertured collars arranged in three sets, each composed of two collars. The collars $I'$ and $I^2$ form one set on one side of the hopper, the collars $I^3$ and $I^4$ stand at right angles to the collars $I'$ and $I^2$, and the collars $I^5$ and $I^6$ are located diametrically opposite the collars $I'$ and $I^2$ on the opposite side of the hopper, as is plainly shown in Fig. 12. The collars project at their lower ends slightly below the bottom of the hopper I and travel on a ring $H'$, secured on the seat H. (See Fig. 11.)

In the seat H and in the ring $H'$ are arranged the apertures $H^2$, $H^3$, and $H^4$, of which the latter stands diametrically opposite the aperture $H^2$, and the aperture $H^3$ stands at right angles to the apertures $H^2$ and $H^4$. The collars $I'$ $I^2$ are adapted to register alternately with the aperture $H^2$. The collars $I^3$ and $I^4$ are adapted to register alternately with the aperture $H^3$, and the collars $I^5$ and $I^6$ are adapted to register alternately with the aperture $H^4$.

From the apertures $H^2$ and $H^4$ extend downward the chutes J and $J'$, respectively, leading to the furrows made by the plows $E^3$, formed on the under sides of the bottom parts $E^2$ of the mold-board E. From the aperture $H^3$ a chute $J^3$ leads downward and divides into two parts $J^4$ and $J^5$, leading to the sides of the machine in front of the chutes J and $J'$.

On the upper end of the spindle G a collar $G'$ is secured by set-screws or other means, and from this collar $G'$ extend the arms $G^2$, $G^3$, and $G^4$ directly above the bottom of the hopper, and arranged in such a manner that the arms $G^2$ and $G^4$ are diametrical, while the arm $G^3$ stands at right angles to the other two arms. The outer ends of the arms $G^2$, $G^3$, and $G^4$ pass over the sets of collars $I'$ $I^2$, $I^3$ $I^4$, and $I^5$ $I^6$. The arms serve to cut off the supply of fertilizer when the respective collars $I'$ $I^2$, $I^3$ $I^4$, and $I^5$ $I^6$ register with their corresponding apertures $H^2$ $H^3$ $H^4$ in the seat H.

At the rear of the fertilizer-hopper I is held the seed-box K, provided with a longitudinally-extending partition $K'$, which divides the seed-box into two compartments $K^2$ and $K^3$, which may be filled with one kind of seed or with two different kinds of seeds, as desired. The seed-box K is secured in position by any suitable means, and in its bottom is arranged a segmental slot $K^4$, which has as its center the center of the spindle G, which is also the center of the fertilizer-hopper I. In the middle of the slot $K^4$ are arranged the brushes $K^5$, which extend at their lower ends to the bottom of the slot $K^4$. The segmental slot $K^4$ travels over a segmental arm $I^7$, formed on the rim of the fertilizer-box I, as is plainly shown in Fig. 12. In this segmental arm $I^7$ is held a dropping-plate L, provided with one, two, three, four, or more apertures $L'$, as is plainly shown in Figs. 12, 15, 16, and 17. The plates L are of the same thickness as the arm $I^7$ and fit snugly in the same, so as to travel with the arm $I^7$ when the fertilizer-hopper I turns on the spindle G, as is hereinafter more fully described.

The apertures $L'$ in the drop-plate L are adapted to register with an elongated slot $H^6$, formed in the middle of a segmental ring $H^5$, formed on the ring $H'$, as is plainly shown in Fig. 11. The segmental arm $I^7$ travels directly above the segmental ring $H^5$, so that the apertures $L'$ of the corresponding dropping-plate in the arm $I^7$ alternately register with the elongated aperture $H^6$. The latter is continued through the seat H and discharges into a downwardly and forwardly extending chute $J^6$, leading into the forked part $D'$ of the plow D. When the plate L has two apertures, as shown in Fig. 12, one aperture is in one compartment of the seed-box K and the other in the other compartment, so that one of the apertures delivers one charge of seed from one compartment to the elongated slot $H^6$, and then the other aperture delivers the seed from the other compartment also to the said aperture $H^6$. Thus two kinds of seed may be passed alternately through the aperture $H^6$ into the chute $J^6$ and dropped on the ground through the forked end $D'$ of the plow D. The brushes $K^5$ in the under side of the seed-box bottom serve to brush off any superfluous seed which might pass into the apertures $L'$ in the dropping-plate L. The seed-box K is provided on top with a hinged cover $K^6$.

On two opposite sides of the fertilizer-hopper I are secured the lugs $I^8$ and $I^9$, respectively, pivotally connected with the rods N and $N'$, respectively, extending rearward and carrying near their rear ends the shoulders $N^2$ and $N^3$, respectively, adapted to engage corresponding projections formed on the cam-wheels O, $O'$, and $O^2$, secured to the main driving-shaft B on each side of the main driving-wheel C. Each of the rods N and $N'$ is provided with downwardly-extending flanges $N^4$ beside the shoulders $N^2$ and $N^3$, and adapted to fit over the sides, one at a time, of the cam-wheels O, $O'$, or $O^2$. The flanges $N^4$ thus hold the respective rod N or $N'$ in contact with the rim of the respective cam-wheel, so that the respective projections on the cam-wheels engage the shoulder $N^2$ or $N^3$ of the corresponding rod N or $N'$.

The cam-wheels on each side of the machine are preferably three in number, as illustrated in the drawings, one cam-wheel O being provided in its rim with four projections $O^5$, standing diametrically opposite each other and equal distances apart. The cam-wheel $O'$ is provided with two diametrical projections $O^4$, and the cam-wheel $O^2$ is provided with only one projection $O^3$. The cam-wheels O, O', and $O^2$ are secured together by suitable means, as illustrated in Figs. 9 and 10, with a sufficient space between them to permit the passage of the flanges $N^4$.

The projection $O^3$ of the cam-wheel $O^2$ on one side of the machine stands diametrically opposite the projection $O^3$ on the other cam-wheel $O^2$ on the opposite side of the machine, and the projections $O^4$ of the cam-wheel O' on one side of the machine stand at right angles to the projections $O^4$ of the cam-wheel O' on the other side of the machine. In a similar manner the projections $O^5$ of the cam-wheel O stand midway between the projections $O^5$ of the cam-wheel O on the other side of the machine. By this arrangement, when the rods N and N', for instance, are engaged by the cam-wheels $O^2$ on both sides of the machine, the projections $O^3$ of the two cam-wheels will permit an alternate turning motion of the hopper I at every revolution of the main driving-wheel C.

In each of the rods N and N', directly behind the shoulder $N^2$ or $N^3$, respectively, are screws P, adapted to ride on the periphery of the respective cam O, O', or $O^2$. This screw P serves to disconnect the corresponding projection $O^3$, $O^4$, or $O^5$ sooner from the shoulder $N^2$, as desired; or the said screw may disconnect the corresponding projection $O^3$, $O^4$, or $O^5$ entirely from the shoulder $N^2$.

To the lug $I^8$ is also pivotally connected a rearwardly and upwardly extending rod Q, pivoted to the outer end of a lever R, fulcrumed at the rear end of one of the side beams of the main frame A. The lever R passes through a longitudinal slot in a keeper S, secured to one of the handles A', fastened to the main frame A in the usual manner. In the ends of the keeper S screw in opposite directions the screws S', which serve to limit the forward and backward motion of the lever R. The handles A' are connected with each other near their outer open ends by the usual cross-beam $A^2$, in which is guided the U-shaped end T of a rod T', extending downward and pivotally connected with the fork U, provided at its ends with outwardly-extending arms U', passing under the rods N and N', respectively, and serving to raise the latter out of contact with the respective cam-wheels O, O', and $O^2$. The arms U' are provided with the extensions $U^2$, pivoted on the side beams of the main frame A. On the rod T' is secured a collar $T^2$ for limiting the outward movement of the rod T', the said collar $T^2$ striking against the cross-beam $A^2$ when the rod is pulled upward by its U-shaped end T.

It will be seen that when the operator pulls at the U-shaped end T the fork U swings upward on the arms $U^2$, so that the arms U' raise the rods N and N' simultaneously. When the U-shaped end T is pushed downward, the arms U' disengage the rods N and N', and the latter remain in contact with the respective cam-wheels O, O', and $O^2$. In the front end and on top of the main frame A is pivoted a sidewise-extending marking-bar V, provided at its outer end with a marking-pin V', serving to lay out a line for the next following row in the usual manner.

The operation is as follows: When the several parts of the machine are in the position illustrated in Figs. 1, 2, and 3, the operator fills the fertilizer-hopper I with a suitable fertilizer, and he places in the seed-box K seed of one kind in both compartments, or he places two different kinds of seed in the two compartments. If planting only corn, for instance, both compartments are filled with seed-corn; but when the operator desires to plant, for instance, corn and beans, he places corn in one compartment and beans in the other. The corn and beans are then planted in separate hills, as hereinafter more fully described.

When the respective rods N and N' are engaged by the cam-wheels $O^2$, the projections $O^3$ will impart a forward motion to the corresponding rod N or N' at every revolution of the main driving-wheel C, and as the said projections $O^3$ of the two cam-wheels $O^2$ are diametrically opposite each other an alternate turning motion will be imparted to the fertilizer-hopper I by the rods N and N' and their cam-wheels $O^2$. This turning motion of the fertilizer-hopper I causes the fertilizer to pass into the apertured collar I', $I^3$, or $I^5$, or into the apertured collar $I^2$, $I^4$, or $I^6$, whichever set is uncovered by the arms $G^2$, $G^3$, and $G^4$. The movement of the fertilizer-hopper I is always such that one of the apertured collars I' $I^2$, $I^3$ $I^4$, or $I^5$ $I^6$ registers with the aperture $H^2$, $H^3$, or $H^4$, respectively, in the seat H. The amount of fertilizer thus passing into the uncovered apertures of the corresponding collars passes under the respective arms G, $G^3$, and $G^4$, and is discharged into the corresponding aperture $H^2$, $H^3$, or $H^4$, so as to fall through the chutes J, J', and $J^2$ into the furrows formed by the side plows $E^8$, held on the under side of the mold-board E. At the same time the turning movement of the fertilizer-hopper I exposes a corresponding aperture L' in the drop-plate L in the respective compartment $K^2$ or $K^3$. The said aperture is then filled with seed, and by the next turning movement of the fertilizer-hopper I the arm $I^7$ swings the drop-plate L with the filled aperture under the brush $K^5$, and also registers said aperture with the elongated aperture $H^6$, through which the seed falls into the chute J and through the same into the middle of the furrow made by the plow D. At the same movement of the fertilizer-hopper I the other aperture in the drop-plate L is returned to the aperture $H^6$ and the amount of seed in the said aperture L' is discharged into the chute J. Thus it will be seen that the amount of seed is discharged alternately into the furrow made by the plow D, and at the same time fertilizer is dropped alongside the central furrow into the furrows made by the plows E³. The furrows made by the plows D and E³ are subsequently covered by the covering-shovels F' and F², so that the fertilizer as well as the seed is covered with earth. It will thus be seen that when the rods N and N' are engaged by the cam-wheels O² the hills of the seed are placed such distances apart as are equal to the semi-circumference of the main driving-wheel C. When the operator desires to make the hills nearer together, he engages the rods N with the cam-wheels O'. In this case the projections O⁴ act twice on each rod N or N' for every revolution of the main wheel C, so that the distance between the hills is equal to one-fourth of the periphery of the main driving-wheel C. In a similar manner the hills can be planted still nearer to each other by engaging the rods N and N' with the cam-wheels O, whereby the projections O⁵ of one cam-wheel act four times on the corresponding rod N or N' for every revolution of the main driving-wheel C. The hills are then but one-eighth of the periphery of the main wheel C apart.

It is understood that when the projection of one cam-wheel moves one of the rods forward, the other rod is moved rearward at the same time, so that the projection of the cam-wheel on the other side moves this other rod forward, whereby the first rod is moved rearward. In the same manner the operator may place one of the rods N or N' in contact with one of the cam-wheels O, O', or O², and place the other rod N or N' in contact with a differently-shaped cam-wheel O², O', or O on the other side of the machine. This is done specially for planting, for instance, two kinds of seed, such as beans and corn. In this case the beans, for instance, will be planted in holes near the corn-hills.

When the operator desires not to drop the seed automatically, as hereinbefore described, but whenever he pleases, he moves the rod T' outward by taking hold of the U-shaped end T and moving the same rearward until the collar T² strikes against the cross-beam A². This motion of the rod T' swings the arms U' upward, so that the rods N and N' are raised and disengaged from the respective cam-wheels O, O', and O². The operator can now shift the fertilizer-hopper whenever he desires by moving the lever R forward or backward, so that the rod Q imparts an alternate turning motion to the fertilizer-hopper I.

When the operator desires to drop less fertilizer into the furrows through one of the apertured collars in the bottom of the fertilizer I, he works the screws P downward, so that the corresponding projections O³, O⁴, and O⁵ of the cam-wheels O², O', or O disengage the shoulders N² or N³ somewhat sooner than before, whereby the distance the fertilizer-hopper I is turned is shortened, and consequently the apertures in the collars I' I², I³ I⁴, and I⁵ I⁶ do not fully register with the corresponding apertures H², H³, and H⁴ in the seat H. A smaller quantity of fertilizer is thus discharged to the ground through the chutes J, J', and J³.

The use of the several drop-plates illustrated in Figs. 15, 16, and 17 is the same as described in the application above referred to.

Having thus described my invention, what I claim as new, and desire to secure by Letters Patent, is—

1. In a planter, the combination, with a main frame, a plow held on the front end of the said frame, and a main driving-wheel held to turn on the rear end of the said main frame, of a fertilizer-hopper held to turn on the said main frame and actuated by rotation of the main wheel, a seed-box held stationary on the said main frame, and a drop-plate held on the said fertilizer-hopper and operating under the seed-box, substantially as shown and described.

2. In a planter, the combination, with a main frame, a plow held on the front end of the said frame, and a main driving-wheel held to turn on the rear end of the said main frame, of a fertilizer-hopper held to turn on the said main frame and actuated by rotation of the main wheel, a seed-box held stationary on the said main frame, a drop-plate held on the said fertilizer-hopper and operating under the seed-box, and a seat provided with apertures and secured on the main frame under the said drop-plate and fertilizer-hopper, substantially as shown and described.

3. In a planter, the combination, with a main frame, a plow held on the front end of the said frame, and a main driving-wheel held to turn on the rear end of the said main frame, of a fertilizer-hopper held to turn on the said main frame and actuated by rotation of the main wheel, a seed-box held stationary on the said frame, a drop-plate held on the said fertilizer-hopper and operating under the seed-box, a seat provided with apertures and secured on the main frame under the said drop-plate and fertilizer-hopper, and fixed arms held in the fertilizer-hopper to cover up alternately the discharge-openings in the bottom of the hopper, substantially as shown and described.

4. In a planter, the combination, with a main driving-wheel and cam-wheels rotating with the said main wheel, of rods actuated by the said cam-wheels, and a fertilizer-hopper mounted to turn and connected at its sides with the said rods, substantially as shown and described.

5. In a planter, the combination, with a main driving-wheel and cam-wheels rotating with the said main wheel, of rods actuated by the said cam-wheels, and a fertilizer-hopper mounted to turn and connected at its sides with the said rods, the said fertilizer-hopper being provided in its bottom with sets of apertures, and a fixed seat having apertures with which are adapted to register alternately the apertures of the sets of apertures, substantially as shown and described.

6. In a planter, the combination, with a main driving-wheel and cam-wheels rotating with the said main wheels, of rods actuated by the said cam-wheels, and a fertilizer-hopper mounted to turn and connected at its sides with the said rods, the said fertilizer-hopper being provided in its bottom with sets of apertures, a fixed seat having apertures with which are adapted to register alternately the apertures of the sets of apertures, and fixed arms held in the said hopper to cover up alternately the apertures in the sets of apertures, substantially as shown and described.

7. In a planter, the combination, with a fertilizer-hopper mounted to turn and provided with sets of apertures in its bottom, a fixed apertured seat held under the said hopper, and fixed arms held in the said hopper over the sets of apertures, of rods connected with the said hopper on its sides, and sets of cam-wheels, substantially as described, for imparting a forward and backward motion to the said rods, as set forth.

8. In a planter, the combination, with a fertilizer-hopper mounted to turn and provided with sets of apertures in its bottom, a fixed apertured seat held under the said hopper, and fixed arms held in the said hopper over the sets of apertures, of rods connected with the said hopper on its sides, sets of cam-wheels, substantially as described, for imparting a forward and backward motion to the said rods, and a main driving-wheel for imparting a rotary motion to the said cam-wheels, substantially as shown and described.

9. In a planter, the combination, with the sets of cam-wheels O, O', and O², each having projections, of rods each having a shoulder adapted to be engaged by the said projections, and a fertilizer-hopper mounted to turn and connected with the said rods, substantially as shown and described.

10. In a planter, the combination, with the sets of cam-wheels O, O', and O², each wheel having one or more projections, of rods connected with the fertilizer-hopper at its sides, shoulders formed on the said rods and operated on by the said projections when the cam-wheels are turned, and flanges held on the said rods on the sides of the shoulders to hold the rods on the cam-wheels, substantially as shown and described.

11. In a planter, the combination, with the sets of cam-wheels O, O', and O², each wheel having one or more projections, of rods connected with the fertilizer-hopper at its sides, shoulders formed on the said rods and operated on by the said projections when the cam-wheels are turned, flanges held on the said rods on the sides of the shoulders to hold the rods on the cam-wheels, and screws in the said rods to engage the periphery of the cam-wheels, substantially as shown and described.

12. In a planter, the combination, with the sets of cam-wheels O, O', and O², each having projections, of rods each having a shoulder adapted to be engaged by the said projections, a fertilizer-hopper mounted to turn and connected with the said rods, and means, substantially as described, for throwing the said rods out of contact with the said cam-wheels, as set forth.

13. In a planter, the combination, with a fertilizer-hopper having apertures in its bottom and mounted to turn, of a fixed apertured seat held under the said hopper, a seed-box secured on the said fixed seat, and a drop-plate held on the said hopper and projecting under the slotted bottom of the said seed-box, substantially as shown and described.

14. In a planter, the combination, with a fertilizer-hopper having apertures in its bottom and mounted to turn, of a fixed apertured seat held under the said hopper, a seed-box secured on the said fixed seat, a drop-plate held on the said hopper and projecting under the slotted bottom of the said seed-box, and a partition held in the said seed-box to divide the latter into two compartments, substantially as shown and described.

15. In a planter, the combination, with a fertilizer-hopper having apertures in its bottom and mounted to turn, of a fixed apertured seat held under the said hopper, a seed-box secured on the said fixed seat, a drop-plate held on the said hopper and projecting under the slotted bottom of the said seed-box, a partition held in the said seed-box dividing the latter into two compartments, rods connected with the said hopper, cam-wheels for operating the said rods, and a main driving-wheel actuating the said cam-wheels, substantially as shown and described.

16. In a planter, the combination, with a fertilizer-hopper having apertures in its bottom and mounted to turn, of a fixed apertured seat held under the said hopper, a seed-box secured on the said fixed seat, a drop-plate held on the said hopper and projecting under the slotted bottom of the said seed-box, a partition held in the said seed-box to divide the latter into two compartments, a rod connected with one side of the said hopper, and a lever pivotally connected with the said rod for turning the said hopper by hand, substantially as shown and described.

17. In a planter, the combination, with a fertilizer-hopper having apertures in its bottom and mounted to turn, of a fixed apertured seat held under the said hopper, a seed-box secured on the said fixed seat, a drop-plate held on the said hopper and projecting under the slotted bottom of the said seed-box, a partition held in the said seed-box to divide the latter into two compartments, a rod connected with one side of the said hopper, a lever pivotally connected with the said rod for turning the said hopper by hand, and means, substantially as described, for limiting the movement of the said lever, as set forth.

18. In a planter, the combination, with a main plow, of a mold-board pivoted on the said plow, and covering-shovels pivotally connected with the said mold-board at its end, substantially as shown and described.

19. In a planter, the combination, with a main plow, of a mold-board pivoted on the said plow, covering-shovels pivotally connected with the said mold-board at its end, and means for connecting with each other the rear ends of the said shovels, as set forth.

WHITMON A. HOLT.

Witnesses:
MELLEN PLUMMER,
A. H. WALKER.